(12) United States Patent  (10) Patent No.: US 7,587,726 B2
Leung  (45) Date of Patent: Sep. 8, 2009

(54) DISPLAY WITH DISC PLAYER

(75) Inventor: Wilson Wai Sing Leung, New Territories (HK)

(73) Assignee: Alco Electronics Limited, Hong Kong (HK)

( * ) Notice: Subject to any disclaimer, the term of this patent is extended or adjusted under 35 U.S.C. 154(b) by 491 days.

(21) Appl. No.: 11/553,060

(22) Filed: Oct. 26, 2006

(65) Prior Publication Data

US 2008/0100739 A1   May 1, 2008

(51) Int. Cl.
*G11B 33/02* (2006.01)
*G06F 1/16* (2006.01)

(52) U.S. Cl. .................. 720/600; 720/653; 361/681; 361/683

(58) Field of Classification Search .................. 720/600, 720/601, 653, 654; 361/679.21, 679.33, 361/679.37
See application file for complete search history.

(56) References Cited

U.S. PATENT DOCUMENTS

| 5,193,051 | A  | * | 3/1993 | Ma .................. 361/679.26 |
| 6,188,569 | B1 | * | 2/2001 | Minemoto et al. ..... 361/679.33 |
| 7,145,767 | B2 | * | 12/2006 | Mache et al. .......... 361/679.21 |
| 7,370,339 | B2 | * | 5/2008 | Hisatomi et al. ............ 720/653 |
| 2005/0206801 | A1 | * | 9/2005 | Miura .......................... 349/58 |

FOREIGN PATENT DOCUMENTS

JP   11220679 A  *  8/1999

* cited by examiner

*Primary Examiner*—Thang V Tran
(74) *Attorney, Agent, or Firm*—Leydig, Voit & Mayer, Ltd.

(57) ABSTRACT

A display has a housing with a front side having a display panel, and an opposing rear side including a recess. A disc player is received in the recess. Hooks and cooperating lips, together with fasteners, connect the disc player to the display. A sector-shaped window in the housing cooperates with a sector-shaped portion of the disc player to enclose a visible sector of a disc in use in the player.

11 Claims, 7 Drawing Sheets

DISPLAY WITH DISC PLAYER

TECHNICAL FIELD

The present invention relates to image display apparatus such as televisions, and more particularly to image display apparatus to which a disc player device may be mounted or unmounted.

BACKGROUND OF THE INVENTION

DVD (Digital Video/Versatile Disc) is a digital-storage technology which permits the storage of video, audio, or data, or a combination thereof upon a laser-readable disc of storage media. The DVD device is a device for writing information to, and retrieving information stored on the storage media disc (or DVD disc). The DVD device is typically a separate unit used with a display such as a television and connected to the display by audio, video and power cabling. To make the connection of the cabling simpler and neater, as well for providing better storage for the DVD device or any like disc device, there is a need for a system for mounting the disc device to the display, while still allowing it to be readily demounted if necessary. It would be advantageous also to provide a window in the disc device allowing the user to visually confirm the presence of a disc in the device. It is an object of the present invention to address this need for an improved display having a disc device.

DISCLOSURE OF THE INVENTION

According to one aspect of the present invention there is provided an image display apparatus comprising:

a housing having a display panel mounted on a front side and an opposing rear side;

a recess in the rear side;

a disc device for writing information to, and/or retrieving information stored on a storage media disc, the disc device being received in the recess;

a lip formed on one of the housing and disc device for facing inwardly of the rear side;

a hook formed on the other of the housing and disc device, the hook engaging the lip to connect the disc device to the housing, and a fastener cooperating with the hook and lip for releasably connecting the disc device to the housing.

In another aspect the invention provides an image display apparatus comprising:

a housing having a display panel mounted on a front side and an opposing rear side;

a recess in the rear side, the recess having a first wail with a pair of cavities therein;

a lip facing inwardly of the rear side and bounding each cavity;

a disc device for writing information to, and/or retrieving information stored on a storage media disc, the disc device being received in the recess and having a pair of hooks, each hook received in a respective cavity and engaging about a respective lip, and a fastener cooperating with the hook and lip pairs for releasably connecting the disc device to the housing.

The housing has an outer housing edge and the recess preferably extends inwardly from the housing edge such that the first wall of the recess is substantially opposite the housing edge, and the disc device has an outer disc device edge aligned with the housing edge.

In still another aspect the invention provides an image display apparatus comprising:

a housing having a display panel mounted on a front side and an opposing rear side;

a recess in the rear side, a disc device for writing information to, and/or retrieving information stored on a storage media disc, the disc device being received in the recess;

fastening means releasably connecting the disc device to the housing, and a sector-shaped projection, in which a sector of a disc is received, is provided in an outer edge of the disc device, projecting from a substantially linear portion of the disc device outer edge.

The disc device preferably has a drawer to which is mounted a turntable and an optical disc-scanning head, the drawer being configured to open to allow placement of the disc onto the turntable such that a sector of the disc is received in the sector-shaped projection, the drawer being slidingly connected to an enclosure of the disc device upon which the fastening means is formed.

Preferably the projection is translucent or includes a window for viewing the disc. The projection is preferably formed in two cooperating parts, a first part fixed to the housing, the first part being translucent or including a window for viewing the disc, and a second part formed in the drawer.

This invention provides image display apparatus such as a television which provides a simple connection for mounting a disc player which may be economically constructed, allowing ready mounting and demounting as necessary. The disc player cooperates with the television construction to enclose a visible sector of the disc, advantageously allowing the user to visually confirm the presence of a disc in the device.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figure 1:
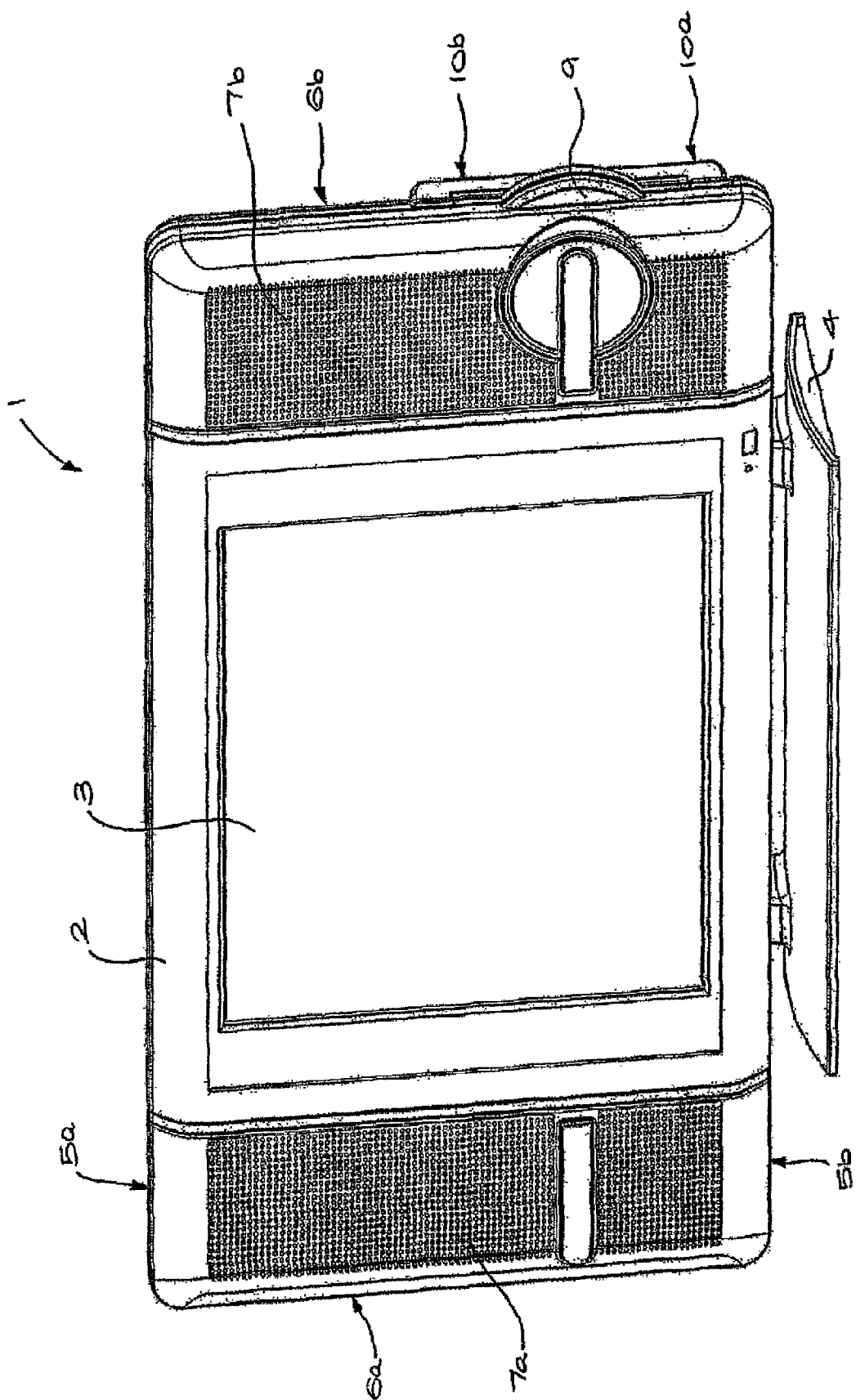
FIG. 1 is a front perspective view of the image display apparatus of the present invention.

Referring to FIG. 1, an image display apparatus 1 includes a housing 2 with a display panel 3 mounted on a front side thereof and a mounting 4 for supporting the device. The housing 2 has a generally rectangular shape, with opposing upper and lower edges 5a, 5b and outer housing edges 6a, 6b on opposite sides. The foraminous faces 7a, 7b of the housing 2 on either side of the panel 3 cover speakers (not shown). A disc device 8 is mounted to the rear side of the housing 2 and includes a sector-shaped projection 9. The disc device 8 has two coplanar edge portions 10*a*, 10*b* which are aligned with the housing edge 6*b* providing a smooth transition between the two parts.

Figure 2:
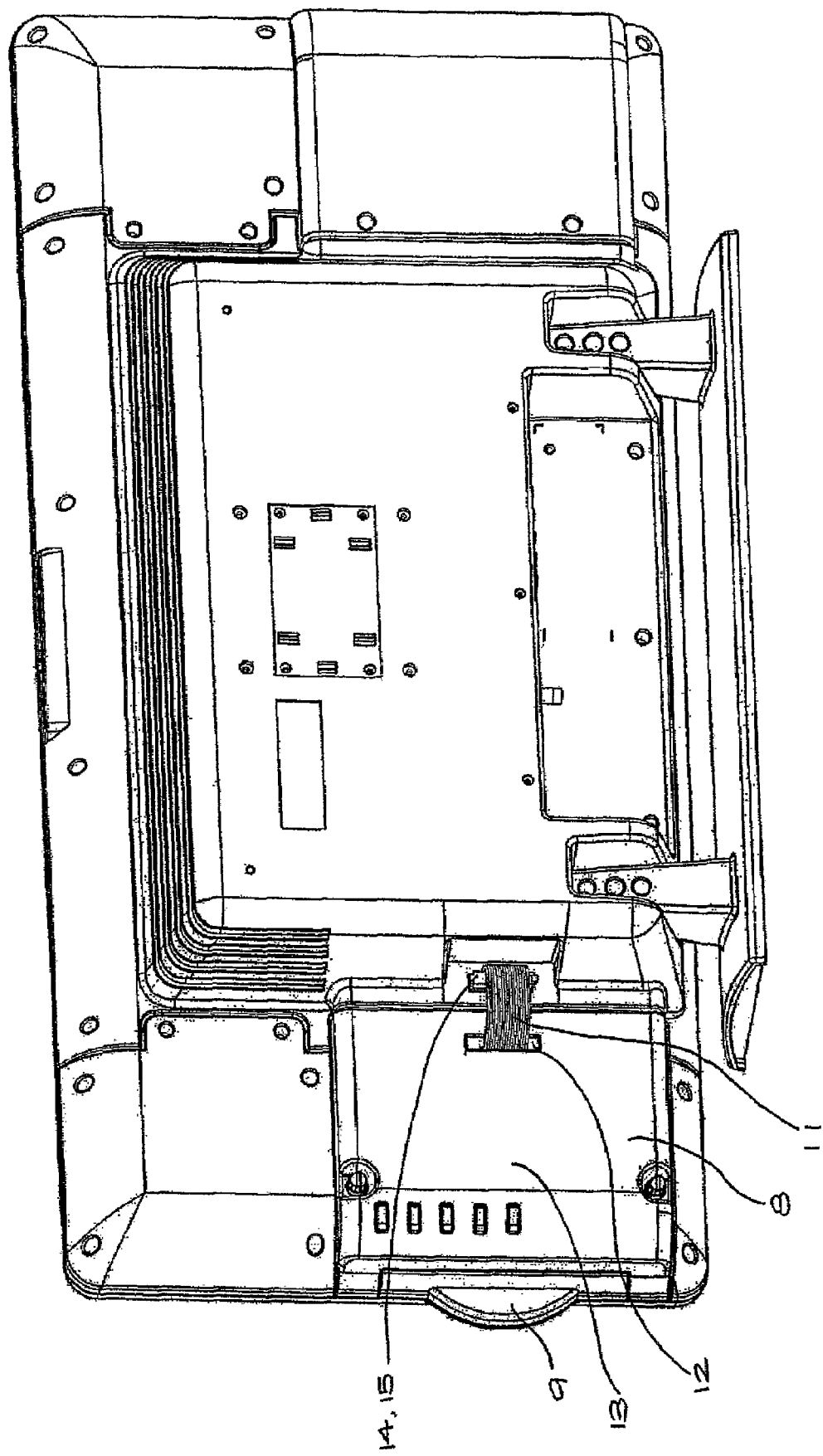
FIG. 2 is a rear perspective view of the apparatus of FIG. 1.

As seen in FIG. 2, a cable bundle 11 projects from an aperture 12 in a planar rear surface 13 of the disc device 8 and is connected by a plug/socket pair 14, 15 to the back of the apparatus 1 for providing the electrical connection between the two components.

Figure 3:
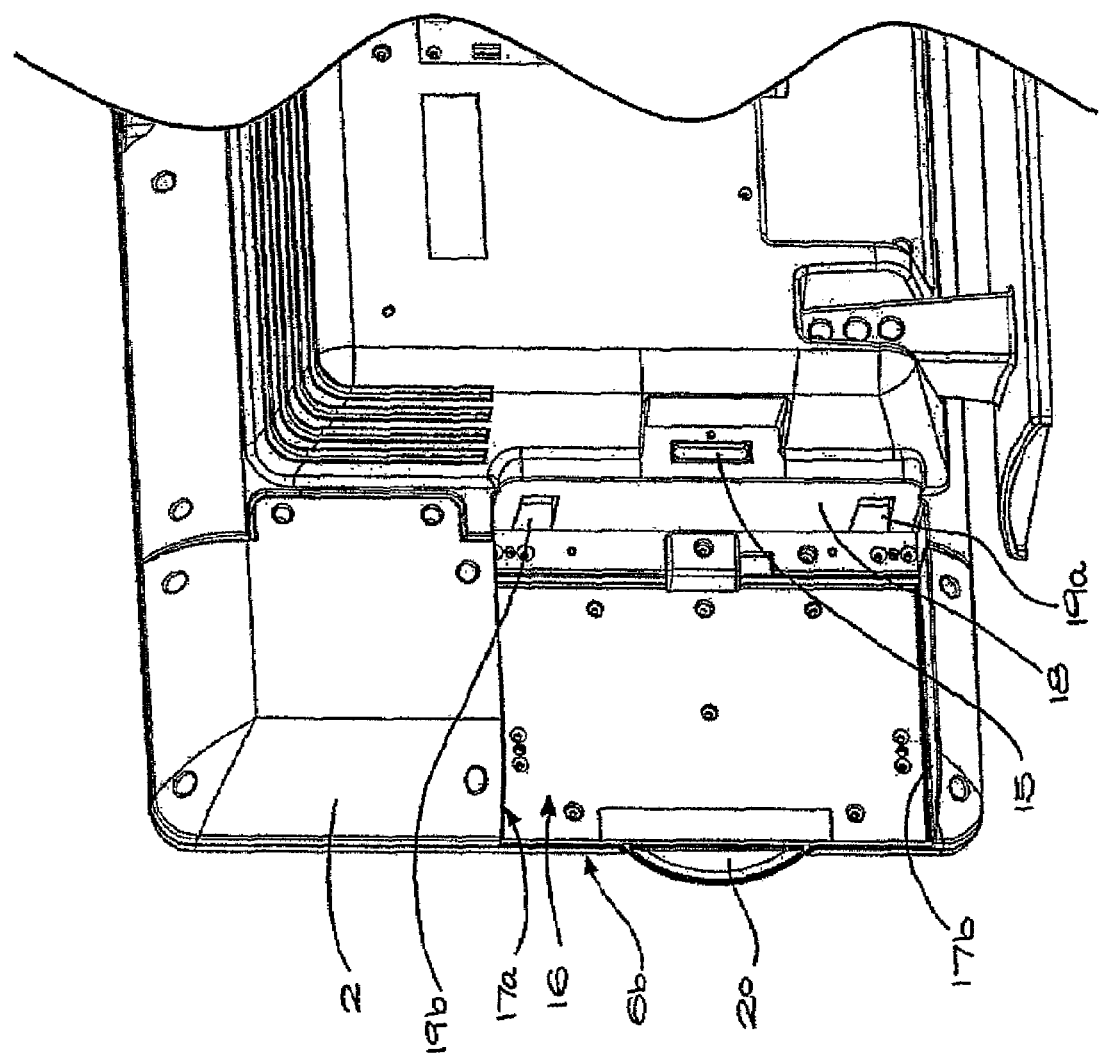
FIG. 3 is a rear perspective view of the apparatus of FIG. 1 with the disc device removed.

The recess 16 in the rear side of the housing 2 for receiving the disc device 8 is shown in FIG. 3. The recess 16 has opposing side walls 17*a*, 17*b* extending inwardly from the housing edge 6*b* to a first end wall 18 that is aligned generally parallel to the linear edge 6*b*. A pair of cavities 19*a*, 19*b* is formed in the wall 18. A transparent sector-shaped window 20 is fixed to the housing 2 and protrudes from the housing edge 6*b*.

Figure 4:
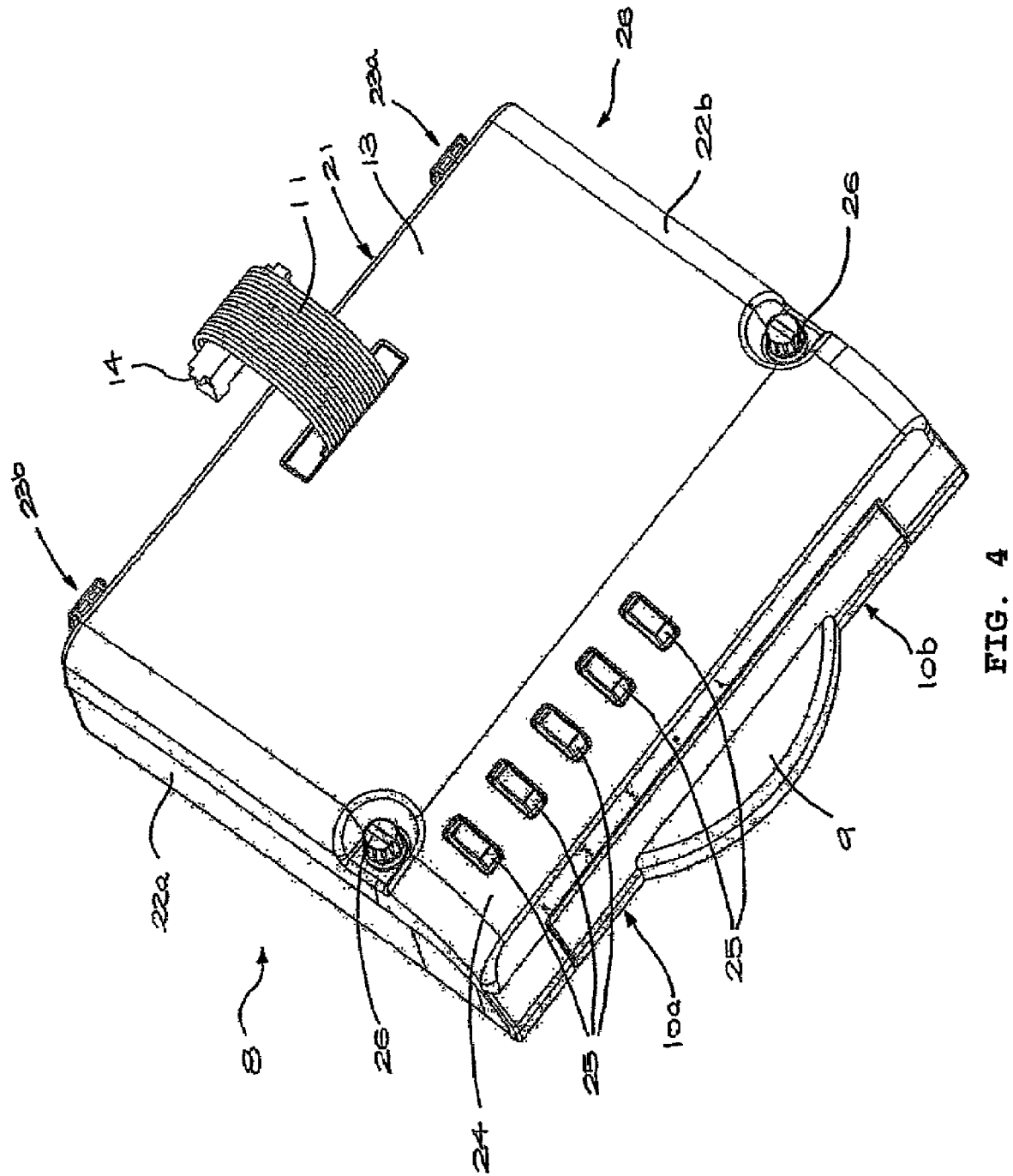
FIG. 4 is a rear perspective view of the disc device of the apparatus of FIG. 1, showing the drawer closed.
Figure 5:
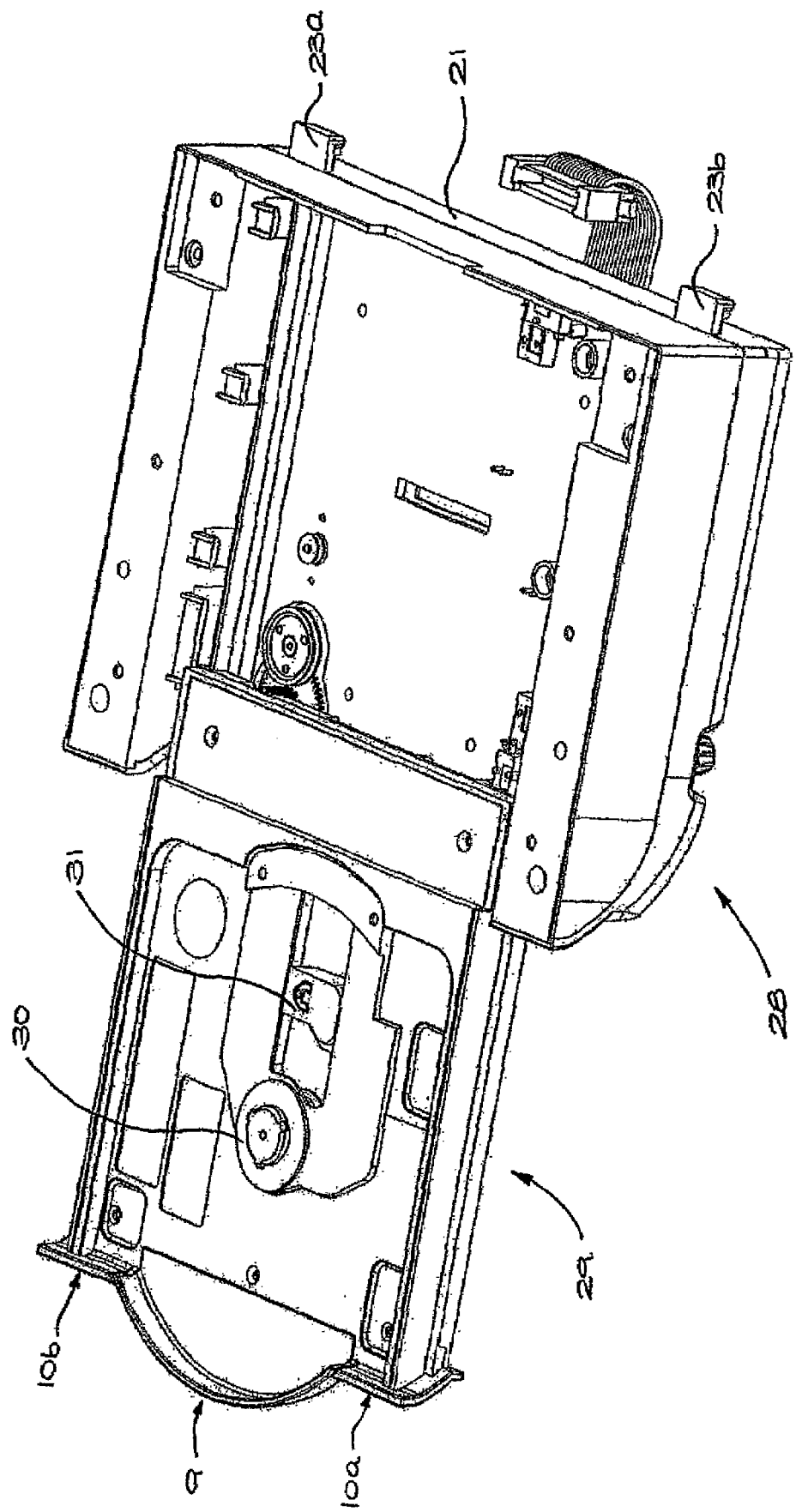
FIG. 5 is a front perspective of the disc device of FIG. 4 with the drawer open.

Referring to FIGS. 4 and 5, the disc device 8 has an enclosure 28 with an inner face 21 generally parallel to the outer edge portions 10*a*, 10*b*, and opposing generally parallel sides 22*a*, 22*b*. Two outwardly-facing hooks 23*a*, 23*b* extend from the inner face 21. Buttons 25 are mounted on an arcuate surface 24 between the outer edge 10*a*, 10*b* and rear surface 13 for control of the operations of the disc device 8. Two screw fasteners 26 are received in through-extending apertures 27 in the enclosure 28.

Received to slide in and out of the enclosure 28 in a direction substantially perpendicular to the outer edge portions 10*a*, 10*b* is a drawer 29 to which is mounted a turntable 30 for receiving a disc and an optical disc-scanning head 31. The sector-shaped projection 9 is formed in the drawer 29, projecting centrally between the two coplanar edge portions 10*a* and 10*b*.

Figure 6:
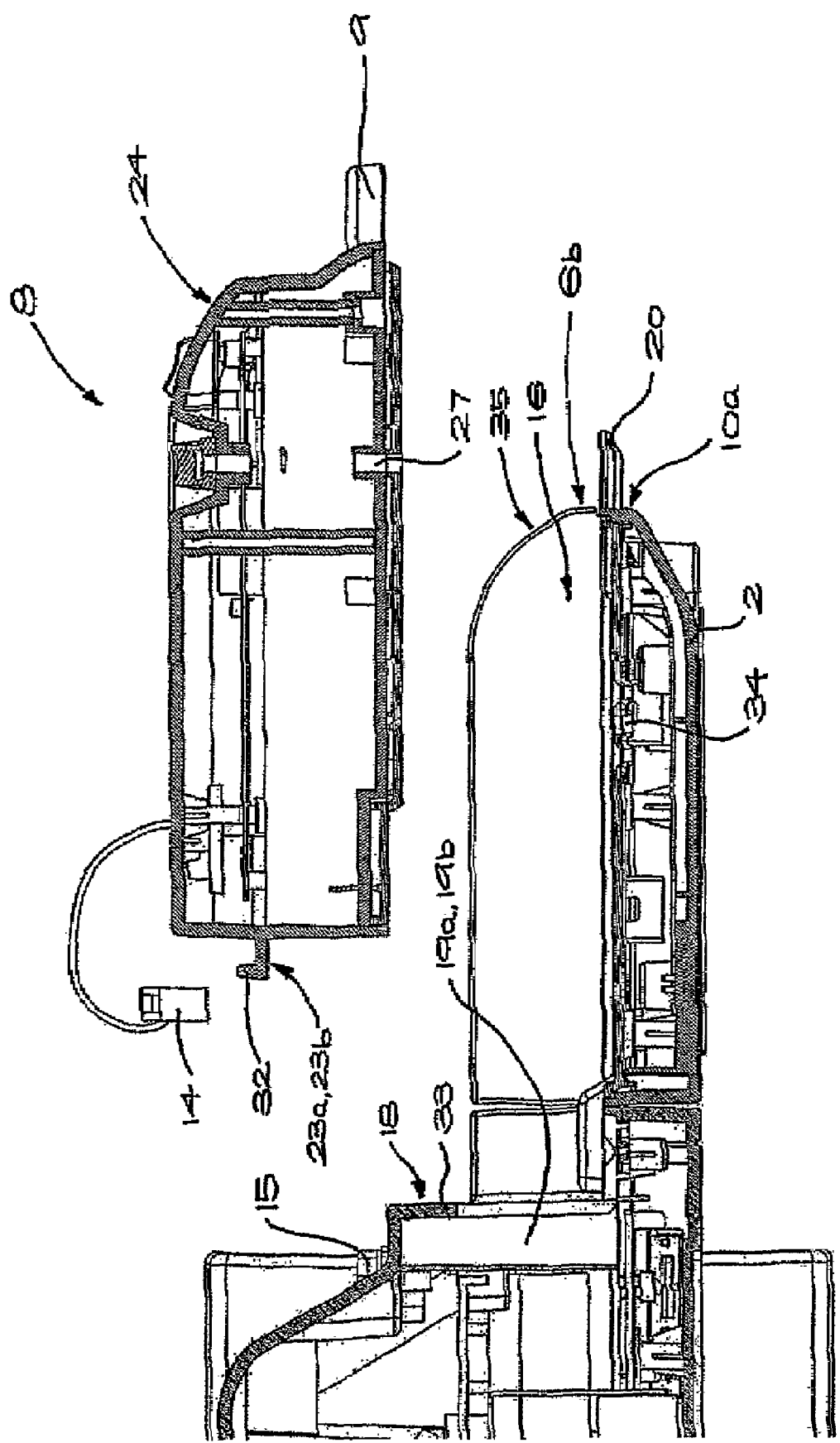
FIG. 6 is a longitudinal cross section through the image display apparatus and disc device before connection.
Figure 7:
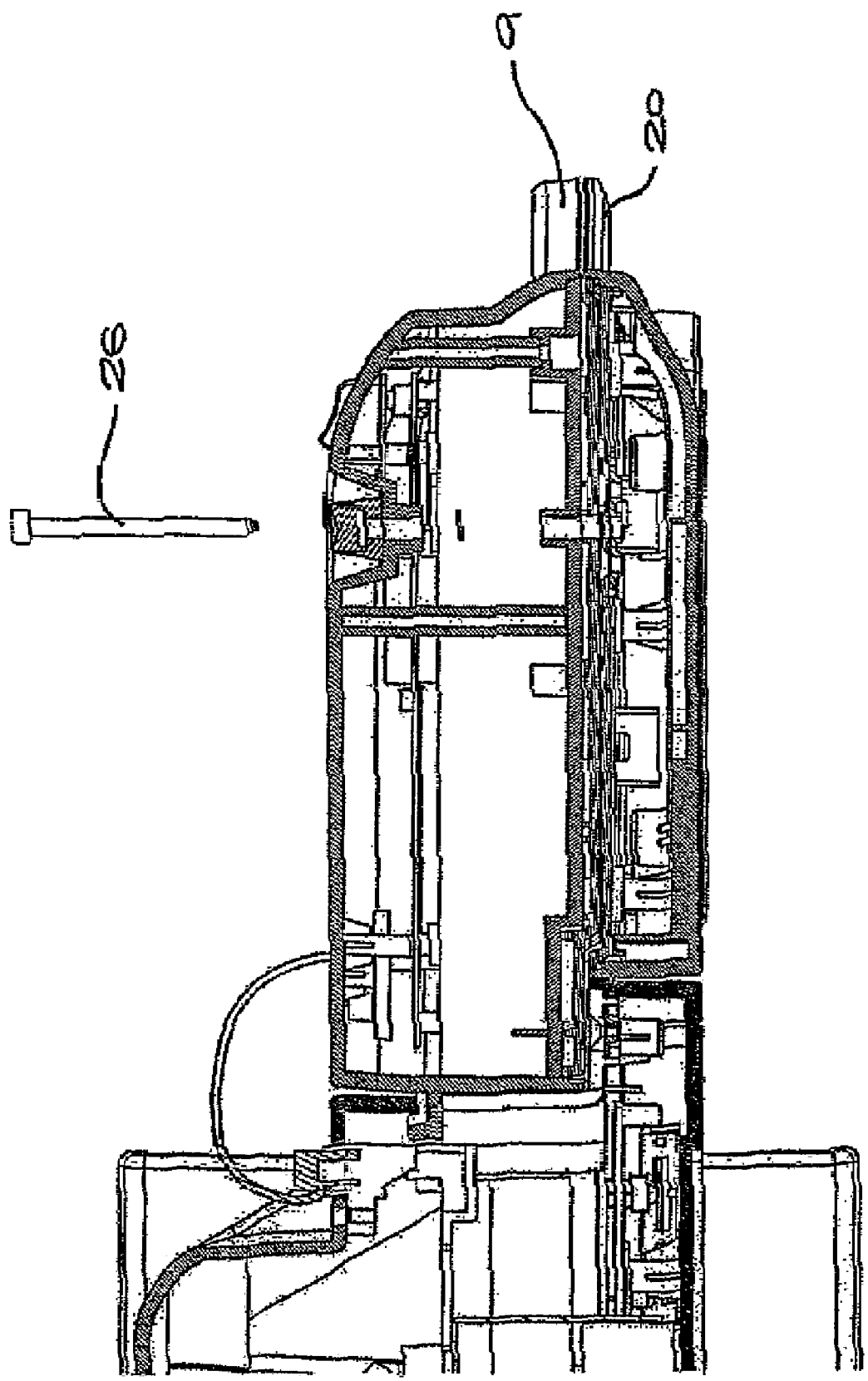
FIG. 7 is a longitudinal cross section through the image display apparatus and disc device when connected.

As best seen in FIG. 6, each hook 23*a*, 23*b* has an outwardly directed end 32 for engaging an inwardly extending lip 33 bounding the cavities 19*a*, 19*b*. In use, the disc device 8 is connected to the image display apparatus 1 by inserting each of the hooks 23*a*, 23*b* into a respective one of the cavities 19*a*, 19*b*, before rotating the disc device 8 to align the screw-threaded fastener-receiving apertures 34 with the apertures 27 and fixing the fasteners 26. The electrical connection is completed by inserting plug 14 into socket 15. The surface 35 of the rear of the display 1 extending from the housing edge 6*b* is arcuate, being curved to match the surface 24 of the disc device 8 to again provide a smooth transition. When fixed in this manner as shown in FIG. 7, with the drawer 29 closed, the projection 9 cooperates with the window 20 to enclose a sector of a disc mounted on the turntable 30, making the disc readily visible to a person viewing the display 3.

Aspects of the present invention have been described by way of example only and it should be appreciated that modifications and additions may be made thereto without departing from the scope thereof.

The invention claimed is:

1. An image display apparatus comprising:
a housing having a front side, on which a display panel is mounted, and an opposing rear side;
a recess in the rear side, the recess having a first wall with a pair of cavities in the first wall;
lips facing inwardly of the rear side and bounding each cavity;
a disc device for writing information to, and/or retrieving information stored on a storage media disc, the disc device being received in the recess and having a pair of hooks, each hook being received in a respective cavity and engaging a respective lip, and
a fastener cooperating with the hooks and the lips for releasably connecting the disc device to the housing.

2. The apparatus of claim 1 wherein
the housing has an outer housing edge,
the recess extends inwardly from the outer housing edge such that the first wall of the recess is substantially opposite the outer housing edge, and
the disc device has an outer disc device edge aligned with the outer housing edge.

3. The apparatus of claim 2 including a sector-shaped projection in which part of a disc is received, the sector-shaped projection projecting from a substantially linear portion of the disc device.

4. The apparatus of claim 3 wherein the disc device has a drawer to which is mounted a turntable and an optical disc-scanning head, the drawer being configured to open to allow placement of a disc onto the turntable such that a sector of the disc is received in the sector-shaped projection, the drawer being slidingly connected to the disc device.

5. The apparatus of claim 3 wherein the projection is translucent or includes a window for viewing the disc.

6. The apparatus of claim 3 wherein the projection includes two cooperating parts for receiving, between the two cooperating parts, a sector of the disc, the two cooperating parts comprising, a first part fixed to the housing, the first part being translucent or including a window for viewing the disc, and a second part in the drawer.

7. An image display apparatus comprising:
a housing having a front side, on which a display panel is mounted, and an opposing rear side;
a recess in the rear side,
a disc device for writing information to, and/or retrieving information stored on a storage media disc, the disc device being received in the recess;
fastening means releasably connecting the disc device to the housing, and
a sector-shaped projection, in which a sector of a disc is received, located in an outer edge of the disc device, projecting from a substantially linear portion of the outer edge.

8. The apparatus of claim 7 wherein the disc device has a drawer to which is mounted a turntable and an optical disc-scanning head, the drawer being configured to open to allow placement of a disc onto the turntable such that the sector of the disc is received in the sector-shaped projection, the drawer being slidingly connected to the disc device upon which the fastening means is located.

9. The apparatus of claim 7 wherein the projection is translucent or includes a window for viewing the disc.

10. The apparatus of claim 8 wherein the projection includes two cooperating parts, a first part fixed to the housing, the first part being translucent or including a window for viewing the disc, and a second part located in the drawer.

11. An image display apparatus comprising:
a housing having a front side on which a display panel is mounted, and an opposing rear side;
a recess in the rear side;
a disc device for writing information to, and/or retrieving information stored on a storage media disc, the disc device being received in the recess;
a lip on one of the housing and disc device and facing inwardly of the rear side;
a hook on the other of the housing and the disc device, wherein the hook engages the lip to connect the disc device to the housing; and
a fastener cooperating with the hook and the lip for releasably connecting the disc device to the housing.

* * * * *